United States Patent [19]

Brown

[11] Patent Number: 5,737,204
[45] Date of Patent: Apr. 7, 1998

[54] METHOD AND APPARATUS FOR INTERFACING BATTERY BACKUP TO POWER FACTOR CORRECTION FRONT END FOR MAINTAINING POWER

[75] Inventor: Alan E. Brown, Georgetown, Tex.

[73] Assignee: Dell U.S.A. L.P., Austin, Tex.

[21] Appl. No.: 542,150

[22] Filed: Oct. 12, 1995

[51] Int. Cl.[6] ........................................ H02M 5/42
[52] U.S. Cl. ........................................ 363/89; 323/285
[58] Field of Search ........................ 363/78, 84, 86, 363/89; 323/271, 282, 285; 307/45, 66; 320/15

[56] References Cited

U.S. PATENT DOCUMENTS

| | | | |
|---|---|---|---|
| 4,694,194 | 9/1987 | Hansel et al. | 307/66 |
| 4,779,007 | 10/1988 | Schlanger et al. | 307/66 |
| 4,780,802 | 10/1988 | Miyashita et al. | 363/37 |
| 5,126,585 | 6/1992 | Boys | 307/66 |
| 5,132,606 | 7/1992 | Herbert | 323/266 |
| 5,144,222 | 9/1992 | Herbert | 323/271 |
| 5,315,553 | 5/1994 | Stich et al. | 364/480 |
| 5,334,926 | 8/1994 | Imaizumi | 320/15 |

*Primary Examiner*—Adolf Berhane
*Attorney, Agent, or Firm*—Stanford & Bennett, L.L.P.

[57] ABSTRACT

A battery backup system using a power factor correction (PFC) front end as a DC-to-DC converter of a power supply for supplying a regulated DC input signal to a main power converter. The battery backup system includes a battery backup for supplying power, a switch circuit for connecting the battery in the event of loss of the AC input signal and a detection circuit for detecting the presence or absence of AC power for controlling the switch circuit. The PFC front end preferably receives either a pulsing DC voltage from a bridge rectifier or the battery voltage and switches this voltage through a series inductor for providing the regulated DC input voltage to the main power converter. The battery is switched in to replace the AC source and rectifier in the event of loss of the AC signal. In the preferred embodiment, the PFC circuit includes a series inductor and diode, a switching transistor and a control circuit for providing the regulated DC input voltage. The backup battery is coupled through a diode and a controlled switch to the input of the PFC circuit.

25 Claims, 3 Drawing Sheets

METHOD AND APPARATUS FOR INTERFACING BATTERY BACKUP TO POWER FACTOR CORRECTION FRONT END FOR MAINTAINING POWER

FIELD OF THE INVENTION

The present invention relates to a battery backup for switching power converters, and more particularly to interfacing a backup battery to power factor correction front end circuitry for maintaining power in the event of loss of the primary power source.

DESCRIPTION OF THE RELATED ART

Loss of primary power is undesirable, particularly for computer systems. This is true for server systems servicing a plurality of users as well as for single user systems, where loss of power causes a certain level of annoyance. To prevent shutdown of an electronic device including computer systems, manufacturers sometimes provide redundant power supplies and/or uninterruptable power supplies (UPS) to maintain power in the event of loss of primary power or failure of the primary power supply. Such redundant or uninterruptable power supplies are expensive.

One particular method to maintain power is an external stand-alone, uninterruptable power supply (UPS). The UPS is typically connected in series between the primary AC power source and the computer system. A backup battery is included to provide energy to a power sine wave generator emulating an AC power signal from the AC source. The power sine wave generator feeds the power supply with AC power via a transfer relay when the primary power fails. The additional sine wave generator is relatively complex and expensive and is not as reliable as desired. Since it is difficult to emulate a sine wave in a cost effective manner, the waveform is often simply a square-wave or a pseudo sine-wave.

Internal solutions for power-loss protection capability also exist. In typical internal PC solutions, a backup battery provides power for a multiple output DC-to-DC power converter, which essentially parallels the output of the main power converter. In particular, the DC voltages for the main planar voltages and rotating memory voltages typically provided by the main switching converter are mirrored by the extra DC-to-DC converter. In this solution, the output of the backup DC-to-DC converter is electrically paralleled with the existing primary switching converter. Thus, an entirely separate converter circuit is necessary thereby increasing the cost of the overall power supply.

A relatively unrelated topic is power factor correction for power supplies. The power factor ($P_F$) is defined as the ratio of the actual power of an alternating or oscillating current provided from an AC source, as would be measured by a watt meter, to the apparent power, as would be measured by an ammeter and voltmeter. The power factor $P_F$ is calculated as the cosine of the phase angle between the voltage applied to a load and the current passing through it. In many existing power supplies, the power factor is relatively low since power factor correction (PFC) is not applied. In general, the AC power signal from the AC source is applied to the inputs of a bridge rectifier, where the output of the rectifier is coupled across a bulk capacitor. The capacitor charges to the peak voltage of the AC signal, so that the diodes of the bridge rectifier only conduct when the AC signal reaches a voltage level near its positive and negative peak values. In this manner, the current delivered is not in the form of a sine wave, but is more in the form of large pulses applied around the peak levels of the input voltage. Such power converters typically have a relatively low factor of 0.7 or 70%, so that the actual working or real power is only 70% of the apparent power. In an ideal power supply, the actual power value is equal to the apparent power value, having a ratio of 1:1, which results in a power factor of 1.0 or 100%. Practical designs attempt to get as close to a $P_F$ of 1.0 as possible.

PFC circuitry is provided when it is desired to increase the power factor of a switching power converter. An exemplary PFC circuit comprises a DC-to-DC converter of some sort inserted between the bridge rectifier and the bulk capacitor. By isolating the bulk capacitor, the PFC front end circuitry causes the input current to appear as more of a sine wave in relative phase with the input voltage to thereby increase the power factor. Ideally, the input current and voltage are both perfect sine waves in phase with each other, so that the load appearing at the AC source is purely resistive, rather than reactive. The more reactive the load of the switching converter, the lower the power factor.

It is desired to provide protection against loss of primary power especially for PC or server computer systems.

SUMMARY OF THE INVENTION

A battery backup system according to the present invention uses a power factor correction (PFC) front end as a DC-to-DC converter for supplying a regulated DC input signal to a main power converter. The battery backup system includes a battery backup for supplying power, a switch circuit for connecting the battery in the event of loss of the AC input signal and a detection circuit for detecting the presence or absence of AC power for controlling the switch circuit. The PFC front end preferably receives a pulsing DC voltage from a bridge rectifier and switches this voltage through a series inductor for providing the regulated DC input voltage to the main power converter. The battery is switched in to replace the AC source and rectifier in the event of loss of the AC signal. The voltage of the battery is typically less than the average voltage of the pulsing DC signal. However, the PFC front end serves as an effective boost converter for converting the voltage of the backup battery to the desired level. Thus, the voltage from the battery is boosted to the desired level by the PFC front end for storage in a bulk capacitor.

In the preferred embodiment, the PFC circuit includes a series inductor and diode, a switching transistor and a control circuit for providing a regulated DC input voltage. The control circuit regulates the DC input voltage by switching current through the series inductor and through the diode and into a bulk capacitor. The voltage of the bulk capacitor is provided as a regulated and filtered input DC voltage to a main power converter. A backup battery is coupled through a diode and a controlled switch to the input of the PFC circuit. The switch is closed or otherwise turned on by the detection circuit to connect the backup battery if the AC signal is lost, so that the backup battery supplies the unregulated DC input voltage.

In a first embodiment, the detection circuit is a missing cycle detection device coupled to detect the presence or absence of the AC power signal. In a second embodiment, a voltage monitoring circuit is coupled to monitor the voltage of the bulk capacitor and to control the switch circuit to connect the backup battery when the voltage of the bulk capacitor falls to a predetermined low voltage level. The predetermined low voltage level is sufficient to maintain operation, but low enough to indicate that the AC power signal is absent or otherwise not delivering power. A voltage detection circuit monitors the voltage of the diode in series with the backup battery to determine when the AC signal is present while the battery is still connected. The voltage of the diode oscillates or otherwise pulsates between being forward and reversed biased when the AC signal is restored. In that case, the voltage detection circuit controls the switch circuit to disconnect the backup battery.

In yet another alternative embodiment, the voltage detection circuit is replaced with a current detection circuit for monitoring the current through the battery. The current oscillates or otherwise pulses when the AC input signal is once again being provided. When such oscillation is detected, the current detection circuit controls the switch circuit to disconnect the backup battery.

A battery backup system according to the present invention therefore maintains power to a main power converter using a backup battery without an extraneous DC-to-DC converter or UPS. The PFC front end serves as an effective converter for the pulsing DC signal from the bridge rectifier or from the battery voltage. The main power converter continues to operate and its operation remains uninterrupted even during temporary loss of AC power.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
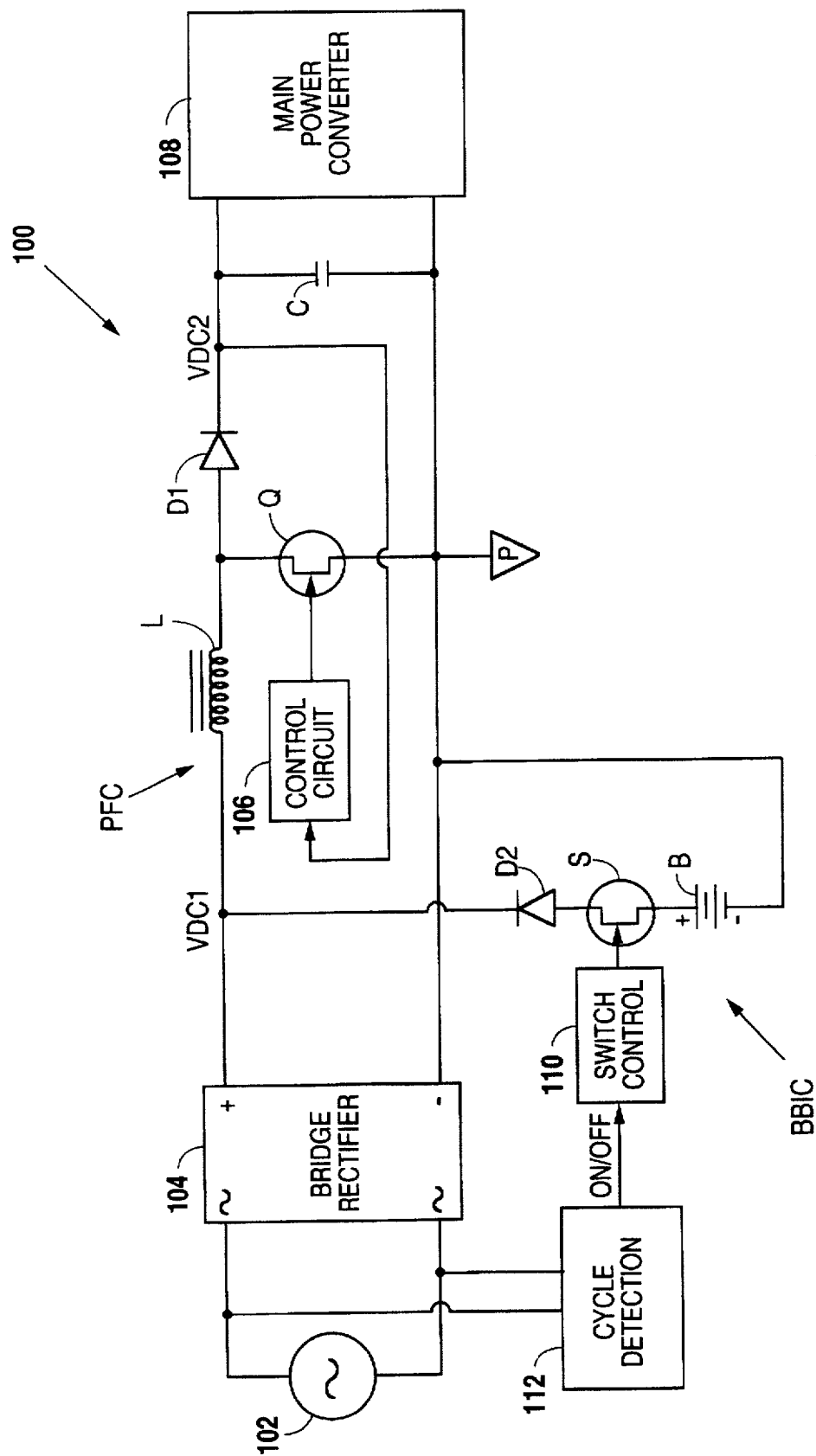
FIG. 1 is a block diagram illustrating a backup battery interface circuit according to the present invention.

Referring now to FIG. 1, a block diagram is shown of a power supply 100 including a battery backup interface circuit (BBIC) implemented according to the present invention. An AC source 102 provides an AC power signal to the inputs of a bridge rectifier 104, which provides a half-sine wave pulsing DC input voltage, referred to as VDC1, at its output terminals. The bridge rectifier 104 is preferably a full-wave bridge rectifier or the like, where the VDC1 signal is not directly filtered by a bulk capacitor and thus pulses in hail-sinusoidal fashion between a primary ground (ground) and the positive peak voltage of the input AC signal. The peak voltage of the AC input signal is typically about 160V or more, and the voltage of the VDC1 signal is approximately 115–120 volts (V) rms.

The VDC1 signal is provided to one end of a series inductor L, having its other end connected to the anode of a diode D1 and to the drain of a metal-oxide semiconductor field-effect transistor (MOSFET) Q. The cathode of the diode D1 provides a regulated input DC voltage, referred to as VDC2, which is filtered across a bulk capacitor C coupled between the VDC2 signal and ground. The VDC2 signal is provided to the control input of a control circuit 106, which asserts a control signal to the gate of the MOSFET Q. The source of the MOSFET Q is connected to ground. The VDC2 signal is provided to the input of a main power converter 108, which converts the VDC2 signal into the regulated voltage signals needed for an electronic device, such as a personal computer (PC) system or the like.

The inductor L, the diode D1, the control circuit 106 and the MOSFET Q form a power factor correction (PFC) circuit for improving the power factor ($P_F$) of the power supply 100. The power factor $P_F$ is defined as the ratio of the actual power to the apparent power delivered to the power supply 100. Without the PFC circuit, the output of the bridge rectifier 104 is applied directly to the bulk capacitor C, which charges to approximately the peak AC voltage and "filters" the DC input signal. However, the diodes within the bridge rectifier 104 conduct only when the AC input signal approaches its positive and negative peak voltage levels, so that the input current pulses on only during a relatively small portion of every cycle. In that case, the power supply 100 appears as a capacitive load, which is reactive rather then resistive, causing the power factor $P_F$ to be reduced to the range of approximately 0.7 or 70%. Ideally, it is desired that the input current be a sine wave that is in phase with the AC input voltage, so that the power supply 100 appears purely resistive rather than reactive. A purely resistive load would result in a power factor $P_F$ of 1.0 or 100%, although this is not achieved with practical circuits.

The PFC circuit is preferably a boost converter circuit which serves to isolate the bulk capacitor C from the AC source 102, so that the power supply 100 appears primarily resistive. The control circuit 106 monitors the VDC2 signal and controls the MOSFET Q to switch current through the inductor L to regulate VDC2 to a predetermined voltage level. Preferably, the VDC2 signal is regulated to approximately 320–325 V. The control circuit 106 is preferably a pulse width modulation (PWM) circuit or the like operating at a relatively high frequency, such as 20 kHz or greater, and more preferably about 100 kHz. The control circuit 106 turns on the MOSFET Q to store energy in the inductor L from the VDC1 signal. The diode D1 is reversed biased while the MOSFET Q is turned on, where the capacitor C provides load current to the main power converter 108. The control circuit 106 then turns the MOSFET Q off, thereby causing the voltage of the inductor L to reverse, which forward biases the diode D1. Energy stored in the inductor L is converted to discharge current which flows into the bulk capacitor C through the diode D1. Since the VDC2 signal is regulated at the desired voltage level and the VDC1 signal is effectively isolated from the bulk capacitor C, the power supply 100 appears substantially as a resistive load having a relatively high power factor $P_F$.

It is known that the AC source 102 may malfunction or otherwise be disconnected, where it is still desired to maintain power. For this purpose, a backup battery B is provided, having its negative terminal coupled to ground and its positive terminal coupled to one end of the current path of a controlled switch S. The switch S is preferably a MOSFET where the battery B is connected to its drain or source. The switch S could also be a bipolar transistor or a relay circuit or the like having a normally open contact. The other end of the current path of the switch S is connected to the anode of a diode D2, having its cathode coupled to the VDC1 signal. The switch S includes a control terminal, such as the gate of a MOSFET or base of a bipolar transistor etc., where the control terminal receives a signal from a switch control circuit 110. The switch control circuit 110 receives an ON/OFF signal from a cycle detection circuit 112, which preferably monitors the AC power signal directly from AC source 102.

The battery B, the switch S, the diode D2, the switch control circuit 110 and the cycle detection circuit 112 form a battery backup interface circuit (BBIC). During normal operation, the AC source 102 provides its AC power signal and the switch S is off or open circuited to isolate the battery B. The cycle detection circuit 112 detects AC cycles and asserts the ON/OFF signal to OFF, where the switch control circuit 110 keeps the switch S off. The particular implementation of the switch control circuit 110 depends upon the particular device used for the switch S, but may simply comprise a gate drive circuit for a MOSFET or a bias circuit for a bipolar transistor, etc. The ON/OFF signal could be a digital signal and the switch control circuit 110 could include logic for detecting the state of the ON/OFF signal and correspondingly controlling the state of the switch S. Alternatively, the ON/OFF signal could be an analog signal and the switch control circuit 110 could simply be gate drive circuitry for turning on and off a MOSFET or biasing circuitry for a bipolar transistor, etc.

In the event the AC source 102 malfunctions or is otherwise disconnected, the cycle detection circuit 112 detects one or more missing cycles and asserts the ON/OFF signal to ON. The switch control circuit 110 respondingly turns on or otherwise closes the switch S, thereby connecting the battery B to the inductor L through the diode D2. The voltage of the battery B may be any desired voltage, but is typically significantly less than the voltage of the VDC1 or VDC2 signals. Since the control circuit 106 regulates the VDC2 signal to 320–325 VDC, the PFC circuit serves to boost the voltage of the battery B to this regulated level. The diode D2 serves to isolate the battery when the inductor L reverses when the MOSFET Q is turned off. The PFC circuit serves as a very effective boost converter for boosting the voltage of the battery B to the regulated voltage of the VDC2 signal. Operation is substantially the same as described above, except that the MOSFET Q remains on for a longer period to store sufficient energy in the capacitor C, and the battery B supplies more current.

The actual voltage of the battery B depends upon the operating limits of the PFC circuit and the sizes or values of the particular components. These parameters are a matter of engineering and design choice. The more important parameter is the capacity of the battery B, which is indicative of the amount of power that the battery B is able to supply. The capacity of the battery B is chosen sufficient to maintain power to the main power converter 108, where the battery B, due to its lower voltage level, generally supplies a greater amount of current through the inductor L as compared to the bridge rectifier 104.

When the AC source 102 is eventually restored, the VDC1 signal is once again sourced from the bridge rectifier 104. The diode D2 also serves to protect the battery B by isolating it from the AC source 102. The diode D2 is reversed biased when the absolute voltage of the AC signal rises above the voltage of the battery B, and is forward biased when the AC signal falls below the voltage of the battery B. The control circuit 106 continuously monitors the VDC2 signal and regulates its voltage, so that the main power converter 108 remains substantially unaffected. Thus, switching between the AC source 102 and the battery B is effectively transparent. Nonetheless, it is not desired to continuously source power from both the AC source 102 and the battery B at the same time. The cycle detection circuit 112 detects that the AC source 102 is providing the AC power signal and asserts the ON/OFF signal to OFF, where the switch control signal 110 respondingly opens the switch S to disconnect the battery B.

Figure 2:
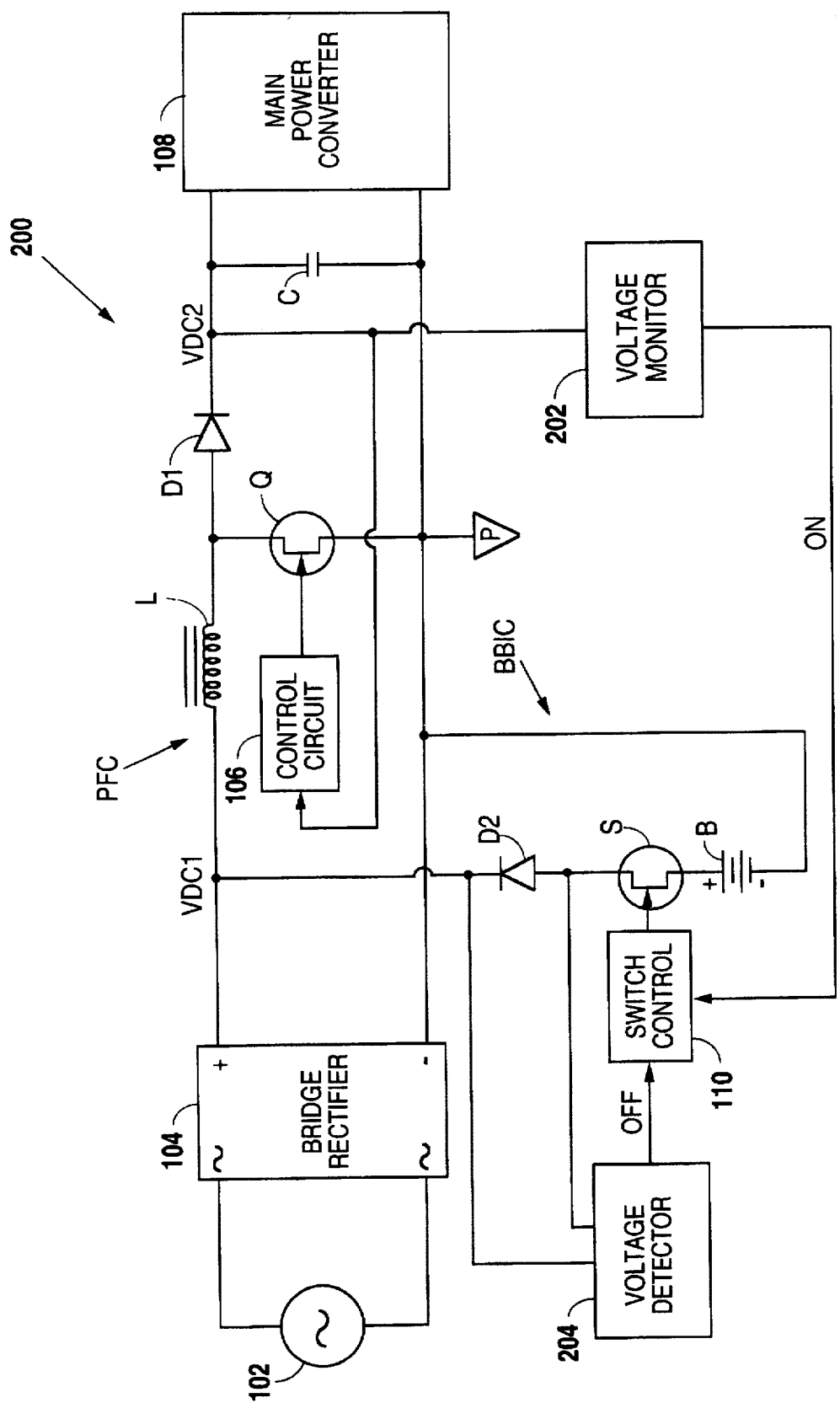
FIG. 2 is a block diagram illustrating a backup battery interface circuit according to an alternative embodiment of the present invention.

Referring now to FIG. 2, a block diagram is shown illustrating a power supply 200 including a backup battery interface circuit (BBIC) according to an alternative embodiment of the present invention. The power supply 200 is similar in design and operation as the power supply 100, except that the cycle detection circuit 112 is replaced with a voltage monitor circuit 202 and a voltage detection circuit 204. The remaining components are similar and assume identical reference numerals as in FIG. 1. The voltage monitor circuit 202 receives and monitors the VDC2 signal and asserts a signal ON to the switch control circuit 110 when the VDC2 signal falls to a predetermined low voltage level. The voltage detection circuit 204 is coupled to monitor the voltage across the diode D2 and asserts a signal OFF to the switch control circuit 110 when the diode D2 is reversed biased or is otherwise oscillating between being reverse and forward biased. The ON and OFF signals operate in a similar manner as the ON/OFF signal of FIG. 1 and could be combined into a single signal if desired. The predetermined low voltage level is sufficient to maintain operation of the main power converter 108, but low enough to indicate that the AC source 102 is no longer providing the AC input signal. For example, if the VDC2 signal is regulated at 320V during normal operation, a low voltage level of approximately 150V would be sufficient to maintain operation of the main power converter 108 but would also be low enough to indicate that the AC power signal is absent and not being provided. When the voltage of the VDC2 signal falls below the predetermined low voltage level, the voltage monitor circuit 202 asserts the ON signal, and the switch control circuit 110 closes or otherwise activates the switch S. The battery B then provides power to the power supply 200 in a similar manner as described previously. The capacitor C effectively maintains power to the main power controller 108 in the interim.

Once the battery B is providing power, the voltage of the VDC2 signal is regulated back to its normal operating level. Thus, the voltage monitor circuit 202 is generally unable to determine when the AC source 102 is operating normally and providing the AC power signal. The voltage detection circuit 204 is provided for this purpose. It detects that the diode D2 is reversed biased during a portion of every cycle of the AC power signal or otherwise oscillating, and correspondingly asserts the OFF signal. This detection function is preferably performed by monitoring the voltage across the diode D2. The switch control circuit 110 respondingly opens or otherwise turns off the switch S to disconnect the battery B. Operation resumes in normal fashion until the AC source 102 once again malfunctions or is disconnected.

Figure 3:
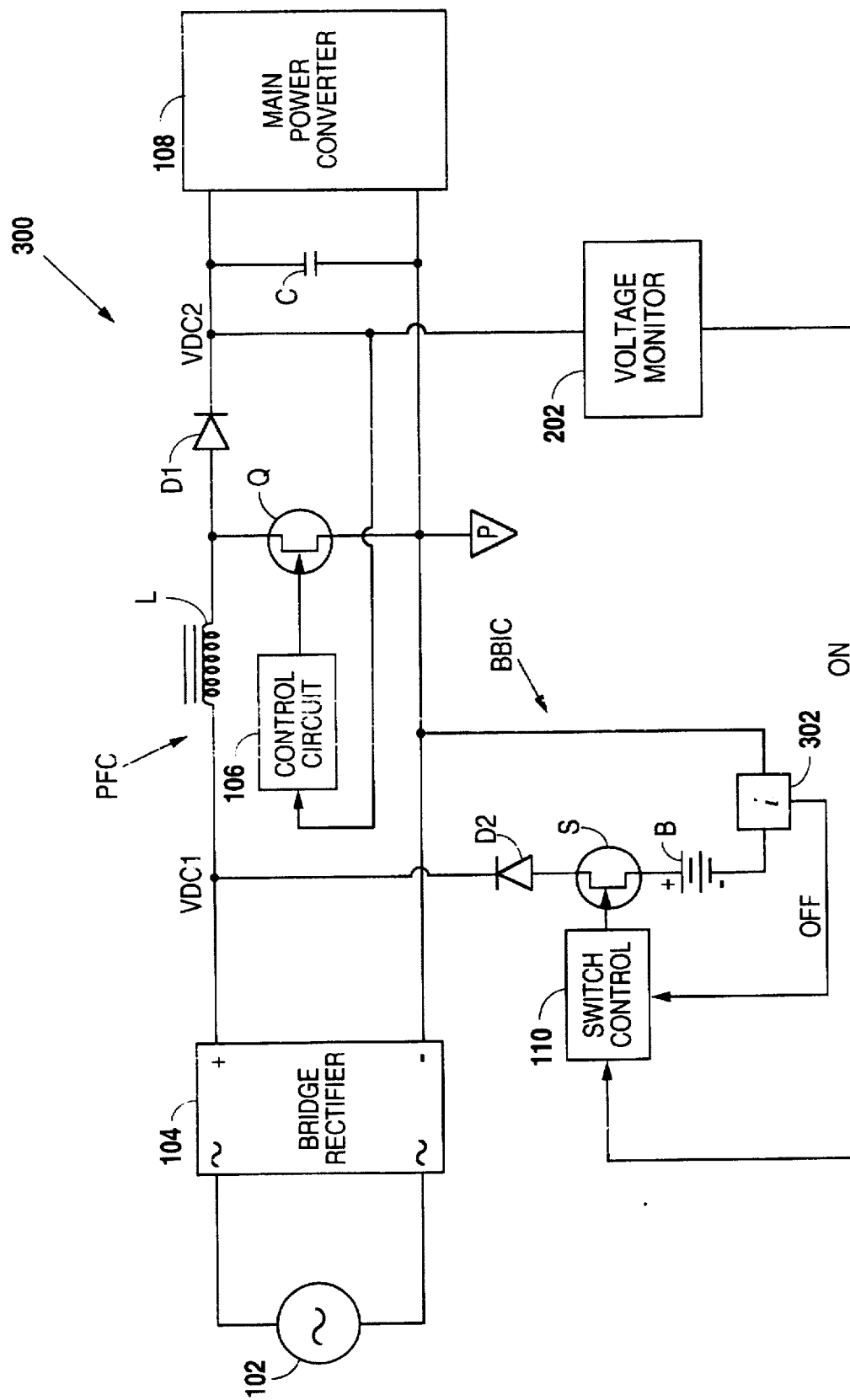
FIG. 3 is a block diagram illustrating a backup battery interface circuit according to yet another alternative embodiment of the present invention.

Referring now to FIG. 3, a block diagram is shown illustrating a power supply 300 including a backup battery interface circuit (BBIC) according to another alternative embodiment of the present invention. The power supply 300 is similar in design and operation as the power supply 200, except that the voltage detection circuit 204 is replaced by a current detection circuit 302. The current detection circuit 302 is preferably placed between the negative terminal of the battery B and ground. However, it could also be placed between the battery B and the switch S. It may be placed between the switch S and the diode D2 or on the other side of the diode, but this would expose the current detection circuit 302 to higher voltage levels. The remaining components are similar and assume identical reference numerals as in FIG. 2.

The current detection circuit 302 is coupled in series with the battery B and performs a similar function as the voltage detection circuit 204, except that the current detection circuit 302 asserts the OFF signal based on the battery current. In particular, when the current through the battery B and the diode D2 begins oscillating or otherwise pulsing indicating that the AC source 102 is operating normally, the current detection circuit 302 asserts the OFF signal to the switch circuit 110, which respondingly opens or otherwise turns off the switch S. The current monitor circuit 302 does not otherwise affect the battery current.

It is now appreciated that a battery backup interface according to the present invention coupled at the input of a PFC front end maintains power to a main power converter in the event of malfunction of the AC source or loss of the AC input signal. The PFC effectively isolates the bulk capacitor from the bridge rectifier to improve the power factor $P_F$. A backup battery is coupled to supply power if the AC power is lost, and the backup battery is disconnected when AC power is restored. Detection circuitry determines when AC power is available or not and controls a switch circuit for connecting and disconnecting the backup battery. When connected, the backup battery is coupled to the input of the PFC front end, which serves to boost its voltage to the appropriate voltage level for the main power converter. In this manner, power is maintained in the event of loss of primary power through operation of the backup battery and PFC circuitry, without the need for extra regulators or a DC-to-DC converter.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A battery backup system for a first power converter that provides a regulated DC input signal to a second power converter, the first power converter receiving an AC power signal from an AC source and including a bridge rectifier for converting the AC power signal to a pulsing DC signal, said battery backup system comprising:

a power factor correction circuit for receiving the pulsing DC signal that provides the regulated DC input signal;

a detection circuit for detecting the AC power signal;

a backup battery for providing power to the second power converter when the AC power signal is absent; and a switch circuit coupled to said detection circuit, to said power factor correction circuit and to said battery for coupling said battery to the input of said power factor correction circuit when the AC power signal is absent and for otherwise disconnecting said battery.

2. The battery backup system of claim 1, further comprising:

said battery having a voltage level that is below the voltage level of the DC input signal, and said power factor correction circuit operating as a boost converter for boosting the voltage from said battery and for regulating the DC input signal to a predetermined voltage level.

3. The battery backup system of claim 1, wherein said detection circuit comprises:

a cycle detection circuit for receiving the AC power signal from the AC source.

4. The battery backup system of claim 1, wherein said detection circuit asserts at least one activation signal to said switch circuit, wherein said at least one activation signal is indicative of the presence of the AC power signal.

5. The battery backup system of claim 4, wherein said detection circuit comprises:

a voltage monitor for monitoring the voltage level of the DC input signal for asserting a first activation signal indicative thereof;

a diode coupled in series with said battery for isolating said battery when coupled to said power factor correction circuit;

a voltage detection circuit coupled to said diode for asserting a second activation signal to said switch circuit indicative of said diode being reversed biased while said battery is coupled to said power factor correction circuit; and said switch circuit coupling said battery to said power factor correction circuit in response to said first activation signal and disconnecting said battery in response to said second activation signal.

6. The battery backup system of claim 4, wherein said detection circuit comprises:

a voltage monitor for monitoring the voltage level of the DC input signal for asserting a first activation signal indicative thereof;

a current detection circuit coupled in series with said battery for asserting a second activation signal indicative of oscillation of battery discharge current while said battery is coupled to said power factor correction circuit; and said switch circuit coupling said battery to said power factor correction circuit in response to said first activation signal and disconnecting said battery in response to said second activation signal.

7. The battery backup system of claim 1, wherein said switch circuit includes a controlled switch having a current path coupled in series with said battery.

8. The battery backup system of claim 7, wherein said controlled switch comprises a MOSFET.

9. A front end power converter for providing a DC input signal to a DC to DC converter, the power primarily provided from an AC power signal from an AC source, said front end power converter comprising:

a bridge rectifier receiving the AC power signal for providing a pulsing DC signal;

a power factor correction circuit coupled to said bridge rectifier for converting said pulsing DC signal to a regulated DC input signal;

a detection circuit for detecting said AC power signal;

a backup battery for providing power when the AC power signal is absent; and a switch circuit for coupling said battery to an input of said power factor correction circuit when the AC power signal is absent, and for otherwise disconnecting said battery.

10. The front end power converter of claim 9, wherein said power factor correction circuit comprises a boost regulator having an output for providing said DC input signal.

11. The front end power converter of claim 10, further comprising:

a bulk capacitor coupled to said output of said boost regulator for filtering said DC input signal.

12. The front end power converter of claim 11, wherein said boost regulator comprises:

an inductor;

a diode coupled to between said inductor and said bulk capacitor;

a power switch coupled between said inductor and ground;

a control circuit receiving said DC input signal and controlling said power switch to regulate said DC input signal to a predetermined voltage level.

13. The front end power converter of claim 12, wherein said control circuit comprises:

a pulse width modulation circuit for periodically turning on said power switch to store energy in said inductor and for turning off said switch to charge said bulk capacitor.

14. The front end power converter of claim 12, wherein the voltage of said battery is less than the voltage of said predetermined voltage level, and wherein said power factor correction circuit operates to boost input voltage and to regulate said DC input signal.

15. The front end power converter of claim 9, wherein said detection circuit comprises:

a cycle detection circuit receiving the AC power signal.

16. The front end power converter of claim 9, wherein said detection circuit asserts at least one activation signal to said switch circuit, and wherein said at least one activation signal is indicative of the presence of the AC power signal.

17. The front end power converter of claim 16, wherein said detection circuit comprises:

a voltage monitor for monitoring the voltage level of said DC input signal for asserting a first activation signal indicative of said DC input signal falling at or below a predetermined voltage level;

a diode coupled in series with said battery for isolating the battery when coupled to said power factor correction circuit while the AC power signal is present; and a voltage detection circuit coupled to said diode for asserting a second activation signal to said switch circuit indicative of said diode being reversed biased while said battery is coupled to said power factor correction circuit;

wherein said switch circuit couples said battery to said power factor correction circuit in response to said first activation signal and disconnects said battery in response to said second activation signal.

18. The front end power converter of claim 16, wherein said detection circuit comprises:

a voltage monitor for monitoring the voltage level of said DC input signal for asserting a first activation signal indicative of said DC input signal falling at or below a predetermined voltage level; and a current detection circuit coupled in series with said battery for asserting a second activation signal indicative of oscillation of battery discharge current while said battery is coupled to said power factor correction circuit;

wherein said switch circuit couples said battery to said power factor correction circuit in response to said first activation signal and disconnects said battery in response to said second activation signal.

19. The front end power converter of claim 9, wherein said switch circuit includes a transistor having a current path coupled in series with said battery.

20. The front end power converter of claim 19, wherein said transistor comprises a MOSFET.

21. A method for maintaining power to a main power converter of a power supply receiving an AC power signal and including a bridge rectifier for converting the AC power signal to a pulsing DC signal, comprising the steps of:

correcting power factor by receiving the pulsing DC signal and providing a regulated DC signal to the main power converter;

determining if the AC power signal is being provided; and replacing the pulsing DC signal by coupling a backup battery if the AC power signal is not being provided.

22. The method of claim 21, wherein said determining step comprises the step of:

determining if the voltage level of the regulated DC signal falls to a predetermined low level.

23. The method of claim 21, further comprising the step of:

determining if the AC power signal is being provided while the battery is coupled; and disconnecting the battery.

24. The method of claim 23, further including a diode coupled in the discharge path of the battery, wherein said determining step comprises the step of:

determining if the voltage across the diode is pulsing.

25. The method of claim 23, wherein said determining step comprises the step of:

determining if the current through the battery is pulsing.

* * * * *